United States Patent
Pujari et al.

(10) Patent No.: US 10,494,696 B2
(45) Date of Patent: Dec. 3, 2019

(54) METAL RECOVERY

(71) Applicant: Alpha Assembly Solutions Inc., Waterbury, CT (US)

(72) Inventors: Narahari Pujari, Bangalore (IN); Siuli Sarkar, Bangalore (IN); Bawa Singh, Marlton, NJ (US); Daniel Goswami, Kolkata (IN)

(73) Assignee: Alpha Assembly Solution Inc., Somerset, NJ (US)

( * ) Notice: Subject to any disclaimer, the term of this patent is extended or adjusted under 35 U.S.C. 154(b) by 181 days.

(21) Appl. No.: 14/900,493

(22) PCT Filed: Jul. 2, 2014

(86) PCT No.: PCT/GB2014/052006
§ 371 (c)(1),
(2) Date: Dec. 21, 2015

(87) PCT Pub. No.: WO2015/004427
PCT Pub. Date: Jan. 15, 2015

(65) Prior Publication Data
US 2016/0304989 A1    Oct. 20, 2016

Related U.S. Application Data

(60) Provisional application No. 61/843,595, filed on Jul. 8, 2013.

(51) Int. Cl.
*C22B 25/06* (2006.01)
*C23F 1/30* (2006.01)
(Continued)

(52) U.S. Cl.
CPC .............. *C22B 25/06* (2013.01); *C01G 19/00* (2013.01); *C22B 25/04* (2013.01); *C23F 1/30* (2013.01); *C23F 1/44* (2013.01)

(58) Field of Classification Search
CPC ......... C22B 7/006; C22B 25/06; C22B 25/04; C23F 1/30; C23F 1/44; C01G 19/00
See application file for complete search history.

(56) References Cited

U.S. PATENT DOCUMENTS 3,990,982 A      11/1976   Dixon
4,374,744 A  *   2/1983    Kawanabe ................ C23F 1/44
                                                          134/3
(Continued)

FOREIGN PATENT DOCUMENTS

CA          913505        10/1972
CN      102398982 A   *   4/2012
(Continued)

OTHER PUBLICATIONS

CN 102398982 A machine translation (Year: 2012).*
(Continued)

*Primary Examiner* — Tima M. McGuthry-Banks
(74) *Attorney, Agent, or Firm* — Carmody Torrance Sandak & Hennessey LLP

(57) ABSTRACT

A method for recovering tin and/or tin alloy from a substrate comprising providing a substrate having tin and/or tin alloy thereon; contacting the tin and/or tin alloy with a stripping solution comprising an inorganic acid and a persulfate compound; recovering tin salt and/or tin alloy salt precipitated from the stripping solution; and recovering tin and/or tin alloy from the tin salt and/or tin alloy salt, respectively.

17 Claims, 1 Drawing Sheet

(51) Int. Cl.
*C23F 1/44* (2006.01)
*C01G 19/00* (2006.01)
*C22B 3/00* (2006.01)

(56) References Cited

U.S. PATENT DOCUMENTS

| | | |
|---|---|---|
| 2011/0275221 A1 | 11/2011 | Schier |
| 2012/0252148 A1 | 10/2012 | Park et al. |
| 2013/0276284 A1* | 10/2013 | Brosseau ................ C22B 7/007 29/426.1 |

FOREIGN PATENT DOCUMENTS

| | | | | |
|---|---|---|---|---|
| DE | 102004014680 | | 7/2005 | |
| EP | 1396557 | | 3/2004 | |
| GB | 349313 A | * | 5/1931 | ............. C22B 25/00 |
| WO | WO-2007/042611 A | * | 4/2007 | |
| WO | 2011130622 | | 10/2011 | |

OTHER PUBLICATIONS

CN 102398982 English abstract (Year: 2012).*
H. Bombach, et al., "Chemisches Entzinnen von Kupferlegierungen", Galvanotechnik, vol. 104, No. 9, pp, 1762-1770, Sep. 1, 2013.
E. Duffek, et al., "Printed Circuit Board Etch Characteristics", Metal Finishing, vol. 66, No. 1, pp. 63-69, Jan. 1, 1968.

* cited by examiner

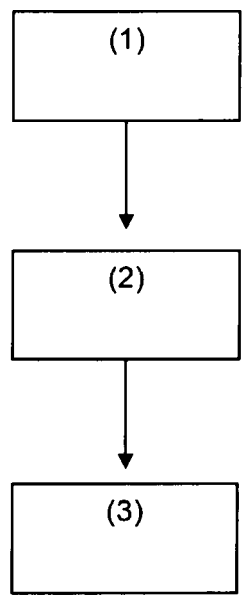

METAL RECOVERY

REFERENCE TO RELATED APPLICATIONS

This application is a PCT national stage application based on PCT/GB2014/052006 filed Jul. 2, 2014, claiming priority to U.S. provisional application 61/843,595 filed Jul. 8, 2013, the entire disclosures of which are incorporated herein by reference.

FIELD OF THE INVENTION

The invention relates to a method for recovering tin and/or tin alloy from a substrate, and to stripping solutions suitable for use therein.

BACKGROUND

Electronic waste such as, for example, waste printed circuit boards (PCBs) and waste connections from photovoltaic cells, may contains large amount of valuable metals. In view of environmental concerns, and the increasing cost of such metals, there is a need for more effective methods of recovering the metals from such waste.

Compositions designed to strip tin and/or tin-lead coatings from copper surfaces are known in the art. Most of these compositions are specifically designed to recover solder from printed circuit boards.

Peroxide-based stripping solutions are known (see, for example, U.S. Pat. Nos. 3,926,669, 4,673,521 and 5,223,087). While these solutions are effective at stripping tin and tin-lead alloy from a copper surface, the reaction is very exothermic and often requires the use of cooling coils to avoid attack of the copper surface itself as the stripping solution heats up. Such solutions are also prone to outgassing.

Stripping solutions containing nitric acid and ferric salt are also effective at tin-stripping (see, for example, U.S. Pat. No. 4,713,144). However, the rate of reaction is typically not controllable, leading to sludge formation and copper etching. These stripping solutions are also very exothermic and, since they comprise hazardous materials, present handling and disposal problems.

Organic and inorganic sulfonic acid-based strippers are capable of stripping tin in a safe, non-exothermic manner (see, for example, U.S. Pat. Nos. 4,957,653, 4,944,851 and 4,921,571). However, such stripping solutions are expensive and are prone to result in re-deposition of tin onto the copper from the stripping bath, which can be difficult to remove without excessive attack on the copper. They are also plagued by sludge formation.

All of the above stripping solutions require an additional step to recover metal from the stripping solution, which increases the overall cost of the process. There is also uncertainty regarding whether such stripping solutions work effectively on different tin-containing alloys such as, for example, tin-silver and tin-bismuth alloys. This is of particular concern when the stripping solutions are to be used on photovoltaic scrap such as, for example, interconnection ribbons and busbars, which typically contain such alloys.

SUMMARY OF THE INVENTION

The present invention seeks to tackle at least some of the problems associated with the prior art or at least to provide a commercially acceptable alternative solution thereto.

In a first aspect, the present invention provides a method for recovering tin and/or tin alloy from a substrate comprising:
    providing a substrate having tin and/or tin alloy thereon;
    contacting the tin and/or tin alloy with a stripping solution comprising an inorganic acid and a persulfate compound;
    recovering tin salt and/or tin alloy salt precipitated from the stripping solution; and
    recovering tin and/or tin alloy from the tin salt and/or tin alloy salt, respectively.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

BRIEF DESCRIPTION OF THE FIGURE

FIG. 1 is a flow diagram of a method according to an embodiment of the present invention.

DETAILED DESCRIPTION OF PREFERRED EMBODIMENTS

The term "persulfate compound" as used herein may refer to a compound containing a peroxosulfate ion, i.e. a sulfate ion in which a peroxide group takes the place of one or more of the oxygen groups.

The term "substrate" as used herein may encompass a substrate comprising metal and/or metal alloy and/or non-metal.

The term "copper substrate" as used herein may encompass a substrate formed of copper metal or copper alloy.

The term "electronic waste" as used herein may encompass any discarded electrical or electronic devices. Electronic waste can take many forms including, by way of example, computers, mobile phones and other household electrical devices. Electronic waste will contain a wide variety of different materials, for example mixed plastics, metals and alloys. Electronic waste may comprise or consist of printed circuit board waste or photovoltaic waste, such as photovoltaic interconnection ribbons and busbars.

The inventors have surprisingly found that the method disclosed herein is capable of selectively recovering tin and/or tin alloy from a substrate. In addition, the precipitation of tin salt and/or tin alloy salt occurs in a single step, meaning that there is no need for a subsequent electrowinning and/or pH precipitation step.

Without being bound by theory, it is considered that the persulfate compound acts upon the tin and/or tin-alloy to initiate the reaction, while the inorganic acid serves to form highly water-insoluble salts of the tin and/or tin alloy, typically oxides or sulfates. The advantages exhibited by these two components are particularly enhanced when both are used in combination.

The inorganic may also serve to stabilize the stripping speed and ensure homogeneous stripping without unevenness.

The method is capable of recovering alloys containing, for example, one or more of lead, silver, copper and bismuth. Accordingly, the method is particularly effective for recovering tin and/or tin alloy from waste, such as, for example, photovoltaic waste, since such waste typically contains large amounts of such alloys.

The method may be carried out on large volumes of waste in an economical manner. Typical batch sizes may be as high as 500 kg or more, or even as high as 1 ton or more.

Following precipitation, the stripping solution may be re-used. This reduces the cost and environmental impact of the method.

The method of the present invention is also rapid, and is typically complete within 30 minutes. In contrast to prior art methods, the method of the present invention does not result in the evolution of toxic gases such as $No_x$.

The tin alloy may contain lead. Alternatively, the tin alloy may be lead-free. The tin alloy may comprise, for example, tin lead alloys (such as, for example, Sn60Pb40), tin-lead-silver alloys (such as, for example, Sn62/Pb34/Ag2), tin-silver alloys, tin-bismuth alloys, tin-copper alloys and tin-silver-copper alloys (such as, for example, SAC305 and the like).

The tin and/or tin alloy may be in the form of, for example, solder or weld or braze material on the substrate.

The recovered tin and/or tin alloy may be used, for example, in a metal solder, for example in a printed circuit board or photovoltaic interconnection ribbon or busbar.

Preferably the substrate comprises copper and/or copper alloy. The method disclosed herein is capable of selectively recovering tin and/or tin alloy without substantial attack of the copper. Small amounts of copper may be dissolved in the stripping solution. However, precipitation of this dissolved copper may be reduced by the presence of the inorganic acid. Accordingly, copper contamination of the recovered tin and/or tin alloy salt may be reduced. When a copper-containing substrate is coated with tin or tin alloys, a thin layer or film of copper-tin alloy (or intermetallic) typically forms at the layer interface. Accordingly, it is a particular advantage of the method of the present invention that it is capable of recovering a copper-tin alloy from a substrate.

Preferably the tin and/or tin alloy is recovered from the tin salt and/or tin alloy salt by smelting. Smelting is capable of recovering tin and/or tin alloy in high purity.

The tin alloy preferably comprises one or more of tin, lead, bismuth and silver. Such alloys are typically contained in electronic waste, especially photovoltaic waste.

The substrate is preferably part of an electronic waste, such as, for example, a printed circuit board (PCB) or a connector for a photovoltaic cell. The substrate may be part of a waste such as, for example, cut leads, brokers, radiators, wires or cables. More preferably, the copper surface is part of a photovoltaic interconnection ribbon or busbar. Such materials typically contain high levels of tin and/or tin alloy suitable for recovery. The method of the present invention is particularly effective at recovering tin and/or tin alloy from such materials.

Waste is typically subjected to a mechanical treatment prior to being contacted with the recovery solution, such as, for example, mechanical shredding and/or granulating.

Preferably the tin and/or tin alloy is contacted with the stripping solution for at least about 1 minute, more preferably at least about 5 minutes, even more preferably from about 10 to about 40 minutes, still even more preferably from 10 to 30 minutes, still even more preferably from 25 to 30 minutes. Increasing the contacting time increases the amount of metal salt precipitated, and therefore the amount of metal recovered. However, for the sake of expediency, the tin or tin alloy is not normally contacted with the stripping solution for more than about 40 minutes, since the level of precipitation exhibited after about 40 minutes is typically not high. Substantially all of the tin and/or tin alloy is typically removed from the substrate within 40 minutes, more typically within 30 minutes meaning that the substrate may be recovered in "pure" form. For example when the substrate is formed of copper, it is typically possible to recover stripped copper with a purity of about 99.5%.

During the contacting step the stripping solution is preferably at a temperature of from about 80 to about 200° F., preferably from about 100 to about 150° F. Elevated temperatures result in faster stripping and precipitation of metal. Temperatures above about 200° F. are preferably avoided in view of energy efficiency and safety concerns. However, the method will function adequately at room temperature, i.e. for example from about 15° C. to about 25° C., typically about 20° C.

The tin salt and/or tin alloy salt is preferably recovered from the stripping solution by filtration or centrifugation. Such techniques are effective and simple to carry out.

The inorganic acid is preferably selected from sulfuric acid, hydrochloric acid and alkane sulfonic acid. Such acids are particularly effective at causing precipitation of metal salts. The alkane sulfonic acid preferably has the formula $RSO_3H$, where R is a lower alkyl group having from 1 to 5 carbon atoms, preferably 1 or 2 carbon atoms, i.e. methane sulfonic acid and ethane sulfonic acid. Sulfuric acid, typically 98% sulfuric acid, is a particularly preferred inorganic acid in the present invention in view of its ease of handling and low cost. The stripping solution preferably comprises from about 10 to about 500 g/l sulfuric acid, preferably from about 50 to about 300 g/l sulfuric acid. If the concentration of acid is too high, then acid-soluble salts may be formed such as, for example, tin sulfate. If the acid concentration is too low, then the tin salt and/or tin alloy salt may not form.

The persulfate compound is preferably selected from ammonium persulfate, sodium persulfate, barium persulfate, lithium persulfate and combinations of two or more thereof. Such persulfates are particularly effective in the present invention and are low cost. Ammonium persulfate is particularly preferred since it avoids metal contamination. The persulfate compound may comprise a peroxomonosulfate ion or a peroxodisulfate ion. Preferably the persulfate compound comprises a peroxodisulfate ion.

The stripping solution preferably comprises at least about 50 g/l persulfate compound, preferably from about 100 to about 500 g/l persulfate compound. If the concentration is less than about 50 g/l, sufficient stripping capability is not exhibited, resulting in only partial removal of tin and/or tin alloy from the substrate.

Preferably the stripping solution further comprises one or more of imidazole, pyridine, triazine, triazine, triazole and derivatives thereof. Such compounds inhibit the corrosion of copper, and reduce copper dissolution in the stripping solution. Examples of suitable imidazole derivatives include 2-methylimidazole, 2-ethylimidazole, 2-propylimidazole, 2-aminoimidazole, 4-methylimidazole, 4-ethylimidazole, 4-propylimidazole, and the like. Examples of suitable pyridine derivatives include 2-methylpyridine, 2-aminopyridine, 2-aminomethylpyridine, 2-carboxypyridine, 2-methylpyridine, 4-aminopyridine and 4-aminomethylpyridine. Example of suitable triazine derivatives include 2,4-diamino-6-methyltriazine, 2,4-diamino-6-ethyltriazine, and like. Examples of suitable triazole derivatives include benzotriazole, carboxybenzotriazole, tolytriazole and their salts. Benzotriazole is a particularly preferred copper corrosion inhibitor. The concentration of the benzotriazole is preferably about 0.1 to about 10 g/l, and more preferably about 0.3 to about 10 g/l. Lower concentrations of benzotriazole may have only a limited effect on the inhibition of copper corrosion. Higher concentrations may not lead to any further increase in copper corrosion inhibition. Accordingly, the benzotriazole concentration is typically kept low for cost benefits.

Preferably the stripping solution further comprises a surfactant. The presence of a surfactant may inhibit re-deposition of metal or metal alloy on the copper surface. The surfactant may also act as a brightener for stripped copper. The surfactant may be a fluorinated surfactant. Fluorinated surfactants as a class are powerful surface active agents, effective at very low concentrations. In practice, the surfactant is generally present in a concentration less than about 2.0% by weight of the composition. Nonionic, cationic and amphoteric surfactants may also be used. Examples of suitable surfactants for use in the present invention include Zonyl FSN Fluorosurfactant (described as a perfluoroalkyl ethoxylate) available from E. I. DuPont de Nemours & Co., Inc., Fluorad FC-430 (described as a fluoroaliphatic polymeric ester) available from the Industrial Chemical Products Division of 3M, ATSURF fluorosurfactants available from Imperial Chemical Industries, alkoxysilanes (such as, for example, polyalkyleneoxide modified heptamethyltrisiloxane), ethers (such as, for example, allyloxypolyethyleneglycol methyl ether and polyoxyethylenecetyl ether), polyoxyethylenesorbitan monooleate, hexadecyl trimethyl ammonium bromide, cetylpyridinium chloride (CPC), benzalkonium chloride (BAC), benzethonium chloride (BZT), 5-bromo-5-nitro-1,3-dioxane, dimethyldioctadecylammonium chloride, cetrimonium bromide, dioctadecyldimethylammonium bromide (DODAB), water-soluble ethylene oxide adducts of an ethylene glycol base, water-soluble ethylene oxide-propylene oxide adducts of a propylene glycol base, a polycarboxylic acid (a dicarboxylic acid having at least 3 carbon atoms), a dimerized carboxylic acid, a polymerized carboxylic acid, and the like.

Preferably the stripping solution further comprises a flocculant. Alternatively a flocculant may be added to the stripping solution prior to recovery of the tin salt and/or tin alloy salt. The presence of a flocculant may aid settling of tin and/or tin alloy precipitate and colloidal particles, and thereby aid recovery. Addition of a flocculant may result in substantially all of the colloidal and suspended particles in the stripping solution settling within about 2 minutes.

The terms "flocculant", "flocculation reagent" or "coagulation reagent" may be used interchangeably. These are compounds that have structures which form a bridge between particles, uniting the particles into random, three-dimensional porous structures called "floes". Thus, the flocculation reagents do not include chemicals that merely act electrostatically by reducing the repulsive potential of the electrical double layer within the colloid. The flocculation reagents have structures for forming floe arrangements upon dispersion. The preferred flocculation reagents may be selected according to given process conditions. A flocculent solution comprising a flocculation reagent means a solution comprising a solvent and at least one flocculation reagent. The flocculent solution may contain a combination of different flocculation reagents, and may also include additional chemicals. The solvent comprises water but may include other compounds as well, as desired. Inexpensive inorganic coagulants, on a per kilogram basis, such as ferric chloride, ferric sulfate, aluminum sulfate, polyaluminum chloride and sodium aluminate may be used to flocculate tin and/or tin alloy salts. These products are effective but have the drawback of increasing the volume of precipitated matter, and often being costly on a per cubic meter of water base. In addition unnecessary metals get introduced into the cake. It is preferred that the flocculent to be a polymeric flocculent.

The term "polymeric flocculent" as used herein is understood to mean any suitable cationic, non-ionic and anionic flocculent.

The flocculation reagent may be an organic polymer flocculent. The polymer flocculent may have a high molecular weight, such as above 10,000,000, or a low molecular weight. The high molecular weight polymers may tend to form more shear resistant floes yet result in more viscous flocculent solutions at the desired dosages. The flocculation reagent may be anionic, cationic, non-ionic, and may have varied molecular weight and structure. By way of example, the flocculent reagent may be natural polymers such as gelatin, starch and alginates or likes or an organic polymer flocculent such as polyethylene oxides, polyacrylamides, anionic polymers, polyelectrolytes, starch, co-polymers that may be polyacrylamide-polyacrylate-based, or another type of organic polymer flocculents. The organic polymer flocculents may be obtained from a flocculent provider and subjected to selection to determine their suitability to the specific commercial application. Examples of commercial materials include but are not restricted to Meca floc 21 a non ionic, Thermax Maxfloc C22, strongly cationic and Maxfloc A11, anionic flocuulent. Mitco ITFLOC® 5845L which is a solution in water comprising an aluminum salt and a high molecular-weight, high charge density polyelectrolyte (cationic), and the like have been found suitable for use in the present invention. Cationic polymeric flocculent materials are well known and a suitable material can easily be selected by one skilled in the art.

If the added amount of flocculent is too small, no flocculation effect can be observed. At higher flocculent amounts, beyond a "lower limit concentration" the flocculation process is effective. Is the flocculent concentration further increased, beyond an "upper limit concentration" restabilization of the suspended particles can occur. The efficiency of a polymeric flocculent is, therefore, limited to a certain concentration, which itself depends on the concentration of the suspended particles in the stripped solution. From about 50 ppm to about 2000 ppm of flocculent is typically used to precipitate the colloidal metal particles, preferably from 50 ppm to 200 ppm.

Contacting the tin and/or tin alloy with a stripping solution preferably comprises immersing the tin and/or tin alloy in the stripping solution.

Preferably the stripping solution comprises an aqueous solvent. Aqueous solvents are low cost and easy to handle. Precipitation of tin and/or tin alloy salt may occur readily from aqueous solvents. The aqueous solvent is typically substantially pure water.

The method may be a batch method or a continuous method. The method may also be carried out by spraying. When spraying is carried out, the stripping solution is typically continuously re-circulated until the copper concentration is about 50 g/l to ensure that the efficiency of the solution is kept high.

Preferably the method is a batch method and the method further comprises re-cycling the stripping solution between batches. The ability to re-cycle the stripping solution increases the cost effectiveness of the method. The stripping solution may become exhausted after a number of uses. Longevity of the stripping solution may be increased by adding fresh persulfate compound between batches.

In a further aspect the present invention provides a method of removing tin and/or tin alloy from a copper substrate comprising:

providing a copper substrate having tin and/or tin alloy thereon;

contacting the tin and/or tin alloy with a stripping solution comprising an inorganic acid and a persulfate compound.

The advantages and preferable features of the first aspect of the present invention apply also to this aspect of the present invention.

Preferably the method further comprises recovering the copper substrate from the stripping solution. The copper substrate may be re-used, for example in a printed circuit board or photovoltaic interconnection ribbon or busbar.

In a further aspect, the present invention provides a stripping solution for stripping tin and/or tin alloy comprising:
an inorganic acid; and
a persulfate compound.

The stripping solution may be used in the methods described herein. The advantages and preferable features of the first aspect of the present invention apply also to this aspect. In particular, the stripping solution is particularly effective at stripping tin and/or tin alloy from a copper surface.

In a preferred embodiment, the inorganic acid is sulfuric acid, the persulfate compound is ammonium persulfate and the stripping solution further comprises:
benzotriazole; and
a surfactant.

In a further aspect, the present invention provides the use of the stripping solution as described herein to remove tin and/or tin alloy from a copper substrate.

FIG. 1 illustrates a method for recovering tin and/or tin alloy from a substrate according to the present invention. In step (1), the tin and/or tin alloy is contacted with a stripping solution comprising an inorganic acid and a persulfate compound. In step (2), tin salt and/or tin alloy salt precipitated from the stripping solution is recovered. In step (3), tin and/or tin alloy is recovered from the metal salt.

The invention will now be described in relation to the following non-limiting examples.

Example 1

A 10 gallon polypropylene reactor equipped with a three blade stirrer was charged with 5% by volume of 98% sulfuric acid and 0.8 g/l of benzotriazole with stirring. 50 g/l ammonium persulfate was slowly added to the tank and the solution was stirred for 5 min. 1.0 Kg of PV interconnect scrap (solder coated copper wires) was then added to the tank and stripping was continued for about 20 min. Clean copper metal with matte finish was exposed with selective precipitation of solder. Slight re-deposition of solder was observed. The precipitate was discharged from the bottom and centrifuged. Solder free solution was then charged back to the reactor for the next batch. Use of the solution was continued until about 50 g/l of copper had been dissolved therein. The efficiency of the stripping solution was monitored by using the acid number method as per standard ASP-WI-QC-002S. The acid number of the solution was kept constant by addition of ammonium persulfate. In general, acid number was maintained at about 100 mg KOH/g of sample.

Example 2

Example 1 was repeated except that sodium persulfate was used in lieu of ammonium persulfate. No change in either stripping rate or efficiency of the composition was observed.

Example 3

Example 1 was repeated except that 0.8 g/l of surfactant (cetyl trimethyl ammonium bromide) was added to the stripping composition. Bright copper was exposed after stripping. No re-deposition of solder was observed. Efficiency and acid number were found to be the same as that in Example 1.

Example 4

Example 3 was repeated except that after the stripping, 2 Lit of 100 ppm flocculation solution (Thermax Maxfloc C22) was added to the stripped solution. Immediate settling of suspended and colloidal particles was observed. Macroflocs thus formed were comparatively easy to filer or centrifuge. Quality of stripping, efficiency and acid number were found to be the same as that in Example 1.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method for recovering tin and/or tin alloy from a substrate comprising:
providing a substrate having tin and/or tin alloy thereon;
contacting the tin and/or tin alloy with a stripping solution consisting essentially of an inorganic acid and a persulfate compound;
adding a flocculant to the stripping solution;
recovering tin salt and/or tin alloy salt precipitated from the stripping solution; and
recovering tin and/or tin alloy from the tin salt and/or tin alloy salt, respectively,
wherein the inorganic acid is selected from sulfuric acid, hydrochloric acid and alkane sulfonic acid; and
wherein the persulfate compound is selected from ammonium persulfate, sodium
persulfate, barium persulfate, lithium persulfate and combinations of two or more thereof; and
wherein the persulfate compound is present in a concentration from about 100 to about 500 g/l.

2. The method of claim 1, wherein the substrate comprises copper and/or copper alloy.

3. The method of claim 1, wherein the tin and/or tin alloy is recovered from the tin salt and/or tin alloy salt by smelting.

4. The method of claim 1 wherein the substrate is part of a photovoltaic interconnection ribbon, busbar, or electronic waste.

5. The method of claim 1 wherein the tin and/or tin alloy is contacted with the stripping solution for at least about 1 minute.

6. The method of claim 1 wherein the tin salt and/or tin alloy salt is recovered from the stripping solution by filtration or centrifugation.

7. The method of claim 1 wherein the concentration of the inorganic acid is between about 10 to about 500 g/l.

8. The method of claim 1 wherein the stripping solution further consists essentially of one or more of imidazole, pyridine, triazine, triazole and derivatives thereof.

9. The method of claim 8 wherein the triazole derivative is benzotriazole and benzotriazole is present in the stripping solution from about 0.1 to about 10 g/l.

10. The method of claim 1 wherein the stripping solution further consists essentially of a surfactant.

11. The method according to claim 10, wherein the stripping solution consists essentially of:
   10 g/L to 500 g/L an inorganic acid selected from sulfuric acid, hydrochloric acid and alkane sulfonic acid;
   100 g/L to 500 g/L of a persulfate compound selected from ammonium persulfate, sodium persulfate, barium persulfate, lithium persulfate and combinations of two or more thereof;
   0.1 g/L to 10 g/L benzotriazole; and
   2.0 wt. % of less of a surfactant.

12. The method of claim 1 wherein contacting the tin and/or tin alloy with a stripping solution comprises immersing the tin and/or tin alloy in the stripping solution.

13. The method of claim 1 wherein the solution further consists essentially of an aqueous solvent.

14. The method of claim 1 wherein the method is a batch method and the method further comprises re-cycling the stripping solution between batches.

15. The method according to claim 1, wherein the method for recovering tin and/or tin alloy does not require subsequent electrowinning and/or a pH precipitation step.

16. A method of removing tin and/or tin alloy from a copper substrate comprising:
   providing a copper substrate having tin and/or tin alloy thereon; and
   contacting the tin and/or tin alloy with a stripping solution consisting essentially of an inorganic acid and a persulfate compound,
   wherein the inorganic acid is selected from sulfuric acid, hydrochloric acid and alkane sulfonic acid; and
   wherein the persulfate compound is selected from ammonium persulfate, sodium persulfate, barium persulfate, lithium persulfate and combinations of two or more thereof; and
   adding a flocculant to the stripping solution.

17. The method of claim 16 further comprising recovering the copper substrate from the stripping solution.

* * * * *